(12) United States Patent  
Yamagata et al.

(10) Patent No.: US 10,684,109 B2  
(45) Date of Patent: Jun. 16, 2020

(54) INDICATOR INSPECTION MACHINE, INSPECTION METHOD, AND INSPECTION PROGRAM

(71) Applicant: MITUTOYO CORPORATION, Kanagawa (JP)

(72) Inventors: Masaoki Yamagata, Kawasaki (JP); Shiro Igasaki, Kawasaki (JP)

(73) Assignee: MITUTOYO CORPORATION, Kanagawa (JP)

( * ) Notice: Subject to any disclaimer, the term of this patent is extended or adjusted under 35 U.S.C. 154(b) by 229 days.

(21) Appl. No.: 16/008,160

(22) Filed: Jun. 14, 2018

(65) Prior Publication Data

US 2018/0364019 A1 Dec. 20, 2018

(30) Foreign Application Priority Data

Jun. 16, 2017 (JP) .................. 2017-118582

(51) Int. Cl.
   *G01B 3/22* (2006.01)
   *G01B 21/04* (2006.01)

(52) U.S. Cl.
   CPC .............. *G01B 3/22* (2013.01); *G01B 21/042* (2013.01)

(58) Field of Classification Search
   CPC ................................ G01B 3/22; G01B 21/042
   USPC ......................................... 33/1 BB, 522, 833
   See application file for complete search history.

(56) References Cited

U.S. PATENT DOCUMENTS

| 1,674,417 | A | * | 6/1928 | Thayer | G01B 3/22 33/193 |
| 4,489,496 | A | * | 12/1984 | Mizuno | G01B 3/22 33/558 |
| 5,421,101 | A | * | 6/1995 | Rank | G01B 3/22 33/784 |
| 2002/0046005 | A1 | * | 4/2002 | Zhang | G01B 3/22 702/183 |
| 2009/0207403 | A1 | * | 8/2009 | Nemoto | G01B 5/008 356/124 |
| 2010/0000307 | A1 | * | 1/2010 | Igasaki | G01B 3/008 73/105 |
| 2012/0246955 | A1 | * | 10/2012 | Smith | G01B 3/22 33/517 |
| 2015/0286354 | A1 | * | 10/2015 | Niwano | G06F 3/0482 715/831 |
| 2017/0115141 | A1 | | 4/2017 | Kurahashi et al. | |

(Continued)

FOREIGN PATENT DOCUMENTS

JP  2002-122403 A  4/2002

*Primary Examiner* — George B Bennett

(74) *Attorney, Agent, or Firm* — Greenblum & Bernstein, P.L.C.

(57) ABSTRACT

An indicator inspection machine inspects the accuracy of an indicator based on a value displayed by the indicator when a spindle changes position. The indicator inspection machine includes a measurement spindle provided so as to be freely raised and lowered in order to displace the spindle of the indicator; a contact point provided to a distalmost end of the measurement spindle, the contact point making contact with an indicator contact point provided to a distalmost end of the spindle of the indicator; a drive mechanism driving the measurement spindle; and a controller controlling the drive mechanism so as to bring the contact point into contact with the indicator contact point while changing a speed of the measurement spindle at a predetermined periodicity.

29 Claims, 9 Drawing Sheets

(56) References Cited

U.S. PATENT DOCUMENTS

2018/0031398 A1\* 2/2018 Niwano .................. G01B 3/22
2019/0358762 A1\* 11/2019 Lause ................. G01B 21/042

\* cited by examiner

INDICATOR INSPECTION MACHINE, INSPECTION METHOD, AND INSPECTION PROGRAM

CROSS-REFERENCE TO RELATED APPLICATIONS

The present application claims priority under 35 U.S.C. § 119 of Japanese Application No. 2017-118582, filed on Jun. 16, 2017, the disclosure of which is expressly incorporated by reference herein in its entirety.

BACKGROUND OF THE INVENTION

1. Field of the Invention

The present invention relates to an indicator inspection machine, an inspection method, and an inspection program.

2. Description of Related Art

Characteristics measured by an indicator such as a dial gauge include several measurement categories such as indication error and repeatability. When, of these, repeatability is inspected, the Japanese Industrial Standards (JIS) or the American Society of Mechanical Engineers (ASME), for example, recommend a measurement method which investigates variation in values indicated by a dial gauge when a spindle of the dial gauge is lifted using a lifting release or the like, after which the spindle is dropped toward a measurement stand with fluctuations in speed, and a contact point on a foremost (distalmost) fend of the dial gauge spindle makes contact with the measurement stand and comes to rest. Therefore, when an indicator inspection machine is used, a contact point of the indicator inspection machine is treated as the measurement stand. This measurement method is effective for detecting variation due to the dial gauge contact point and variation due to backlash of the spindle.

When lifting and dropping of the dial gauge spindle is repeated, the contact point of the dial gauge and the contact point of the indicator inspection machine make contact with each other a plurality of times. Therefore, there is variation in a contact status of the contact point of the dial gauge and the contact point of the indicator inspection machine for each instance of contact. This variation corresponds to the variation that is due to the contact point of the dial gauge.

In addition, when the contact point of the dial gauge is precipitously dropped, the dial gauge experiences oscillation due to an impact at the time the contact point of the dial gauge makes contact with the contact point of the indicator inspection machine. Due to this oscillation, a difference in a holding status of the spindle arises, caused by the clearance between the spindle of the dial gauge and a stem into which the spindle is inserted (in other words, caused by backlash). Accordingly, there is variation in the values indicated by the dial gauge. This variation corresponds to the variation that is due to backlash.

For example, a gauge inspection machine having a linear drive mechanism may be used in an inspection of indicator accuracy (Japanese Patent Laid-open Publication No. 2002-122403 A). In this gauge inspection machine, a contact point of the gauge inspection machine is automatically raised and lowered, and thereby variation in a dial gauge can be inspected without manually dropping the dial gauge. Accordingly, inspection of the dial gauge can be performed more efficiently in a shorter period of time.

The above-noted indicator inspection machine (gauge inspection machine) having the linear drive mechanism is favorable for measuring an indication error of an indicator, but faces issues when measuring repeatability, for the following reason. In the indicator inspection machine having the linear drive mechanism, the spindle of the indicator inspection machine is raised and lowered without rotation, and therefore the contact status between the contact point of the indicator and the contact point of the indicator inspection machine is mostly constant. Therefore, the above-described variation due to the contact point is unlikely to occur. Therefore, the accuracy of repeated measurements is limited.

Also, in order to detect variation due to backlash in the above-noted indicator inspection machine having the linear drive mechanism, the spindle of the indicator inspection machine could conceivably be driven at an acceleration even greater than that of free fall. In such a case, an operation similar in principle to the measurement method using the lifting lever is possible. However, a high-cost drive mechanism (motor or the like) is necessary in order to actually be capable of an operation that exceeds gravitational acceleration, and achieving such an operation is difficult.

SUMMARY OF THE INVENTION

The present invention is conceived in light of the circumstances above and has as an advantage that the present invention is able to inspect variation in an indicated value of an indicator that is influenced by fluctuation in a contact status between a contact point of the indicator and a contact point of an indicator inspection machine.

An indicator inspection machine according to one aspect of the present invention is an indicator inspection machine inspecting the accuracy of an indicator based on a value displayed by the indicator when a spindle of the indicator to be inspected changes position. The indicator inspection machine includes a measurement spindle provided so as to be freely raised and lowered in order to displace the spindle of the indicator; a contact point provided to a foremost end of the measurement spindle, the contact point making contact with an indicator contact point provided to a foremost end of the spindle of the indicator; a drive mechanism driving the measurement spindle; and a controller controlling the drive mechanism so as to bring the contact point into contact with the indicator contact point while changing a speed of the measurement spindle at a predetermined periodicity.

An indicator inspection machine according to another aspect of the present invention is the indicator inspection machine described above, in which the controller controls the drive mechanism such that the measurement spindle is raised and lowered while oscillating at the natural frequency of the indicator inspection machine.

An indicator inspection machine according to another aspect of the present invention is the indicator inspection machine described above having a detection mechanism detecting a position of the measurement spindle, and in which, based on the speed of the measurement spindle and the detected position of the measurement spindle, the controller provides feedback control of operation of the measurement spindle.

An indicator inspection machine according to another aspect of the present invention is the indicator inspection machine described above, in which the drive mechanism includes a motor; a movable portion capable of rising and lowering when driven by the motor; and a speed detector detecting a rotation speed of the motor. The measurement spindle is coupled to the movable portion. The controller provides feedback control of operation of the measurement spindle based on the rotation speed of the motor detected by the speed detector and the detected position of the measurement spindle.

An indicator inspection machine according to another aspect of the present invention is the indicator inspection machine described above, in which the controller includes a displacement amount specifier that outputs a displacement command specifying an amount of displacement to impart to the measurement spindle in accordance with a command specifying a desired position for the measurement spindle; a position compensator outputting a speed command specifying the speed of the measurement spindle based on the displacement command and the position of the measurement spindle detected by the detection mechanism; a speed compensator outputting an electric current command specifying an electric current to supply to the motor based on the speed command and the rotation speed of the motor detected by the speed detector; an electric current compensator to which the electric current command is input; and an amplifier in which an input is connected to an output of the electric current compensator, the amplifier amplifying and outputting to the motor the electric current command that is compensated by the electric current compensator and also feeding a value for the electric current supplied to the motor back to the input of the electric current compensator. Gain of the position compensator is set such that the measurement spindle is raised and lowered while oscillating at the natural frequency of the indicator inspection machine.

An indicator inspection machine according to another aspect of the present invention is the indicator inspection machine described above, in which the drive mechanism performs a step operation raising and lowering the measurement spindle in stepwise fashion.

An indicator inspection machine according to another aspect of the present invention is the indicator inspection machine described above, in which the drive mechanism includes a stepping motor, and a movable portion capable of rising and lowering when driven by the stepping motor. The measurement spindle is coupled to the movable portion.

An indicator inspection machine according to another aspect of the present invention is the indicator inspection machine described above, in which the drive mechanism includes a motor, and a movable portion capable of rising and lowering when driven by the motor. The controller controls the motor so as to perform a step operation.

An indicator inspection machine according to another aspect of the present invention is the indicator inspection machine described above further including an oscillating mechanism (oscillator) configured to be capable of transmitting a generated oscillation to the measurement spindle.

An indicator inspection machine according to another aspect of the present invention is the indicator inspection machine described above, in which when inspecting repeatability of an indicated value of the indicator by measuring the indicated value of the indicator a plurality of times, the controller raises and lowers the spindle such that contact between the contact point of the indicator inspection machine and the contact point of the indicator is maintained during each of the plurality of measurements.

An indicator inspection machine according to another aspect of the present invention is the indicator inspection machine described above, in which when inspecting repeatability of the indicated value of the indicator by measuring the indicated value of the indicator a plurality of times, the controller raises and lowers the spindle such that the contact point of the indicator inspection machine and the contact point of the indicator are separated during each of the plurality of measurements.

An indicator inspection method according to another aspect of the present invention is a method of inspecting an indicator in which accuracy of the indicator is inspected based on a value displayed by the indicator when a spindle of the indicator is displaced in an indicator inspection machine having a measurement spindle provided so as to be freely raised and lowered in order to displace the spindle of the indicator to be inspected, a contact point provided to a foremost end of the measurement spindle, the contact point making contact with an indicator contact point provided to a foremost end of the spindle of the indicator, and a drive mechanism driving the measurement spindle. The drive mechanism is controlled so as to bring the contact point into contact with the indicator contact point while changing a speed of the measurement spindle at a predetermined periodicity.

An indicator inspection program according to another aspect of the present invention is an indicator inspection program in which accuracy of an indicator is inspected based on a value displayed by the indicator when a spindle of the indicator is displaced in an indicator inspection machine having a measurement spindle provided so as to be freely raised and lowered in order to displace the spindle of the indicator to be inspected, a contact point provided to a foremost end of the measurement spindle, the contact point making contact with an indicator contact point provided to a foremost end of the spindle of the indicator, a drive mechanism driving the measurement spindle, and a controller controlling the drive mechanism so as to bring the contact point into contact with the indicator contact point while changing a speed of the measurement spindle at a predetermined periodicity. The program causes the controller to execute a process in which the drive mechanism is controlled so as to bring the contact point into contact with the indicator contact point while changing the speed of the measurement spindle at a predetermined periodicity.

The present invention is capable of inspecting variation in an indicated value of an indicator that is influenced by fluctuation in a contact status between a contact point of the indicator and a contact point of an indicator inspection machine.

The present invention is clarified by the following detailed description and the appended drawings. The appended drawings are referenced only to facilitate understanding and do not serve to limit the present invention.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

Figure 1:
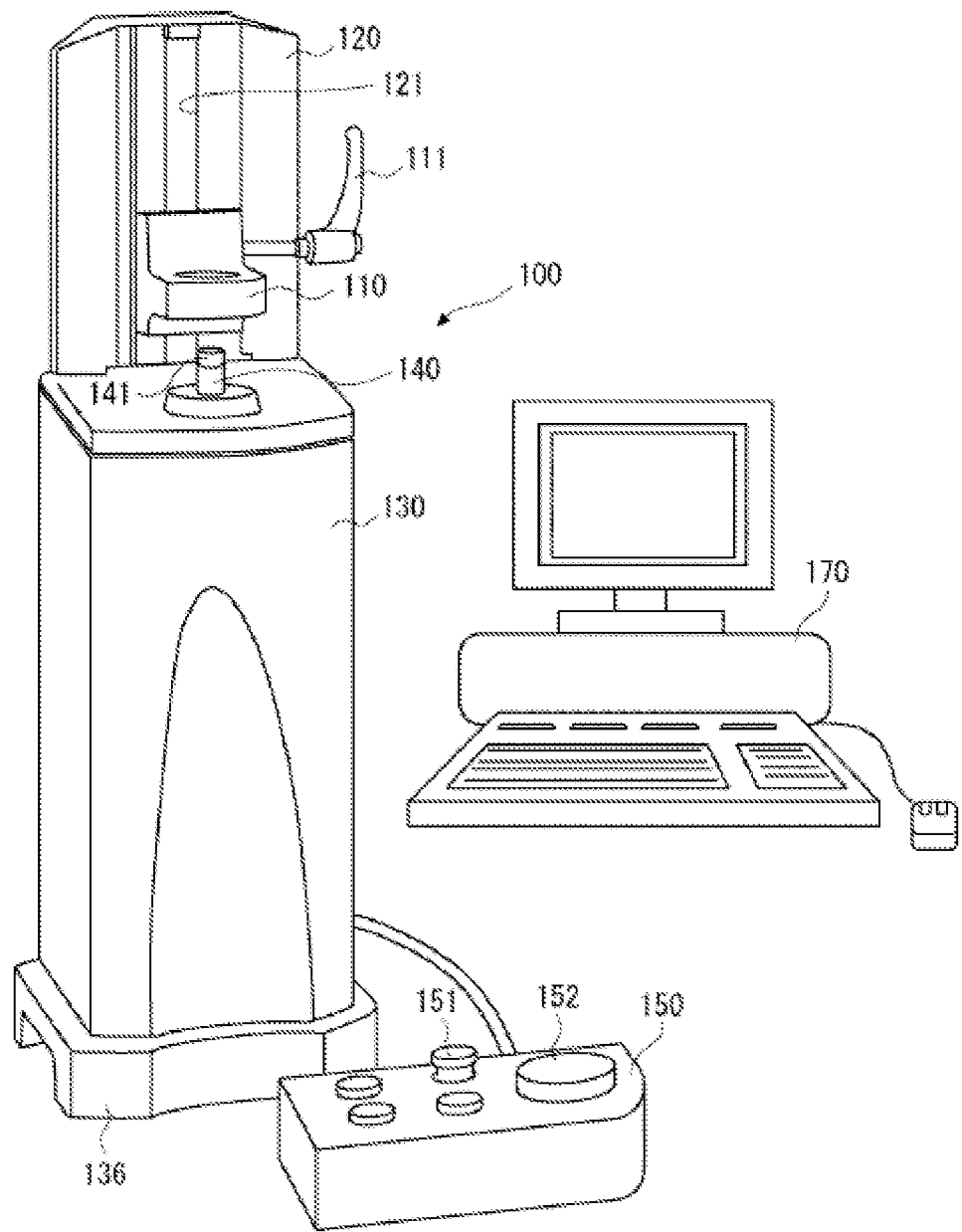
FIG. 1 illustrates an external view of an indicator inspection machine according to a first embodiment.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, embodiments of the present invention are described with reference to the drawings. Identical reference numerals are assigned to identical elements in each of the plurality of drawings, and duplicative descriptions are omitted where necessary.

First Embodiment

Figure 2:
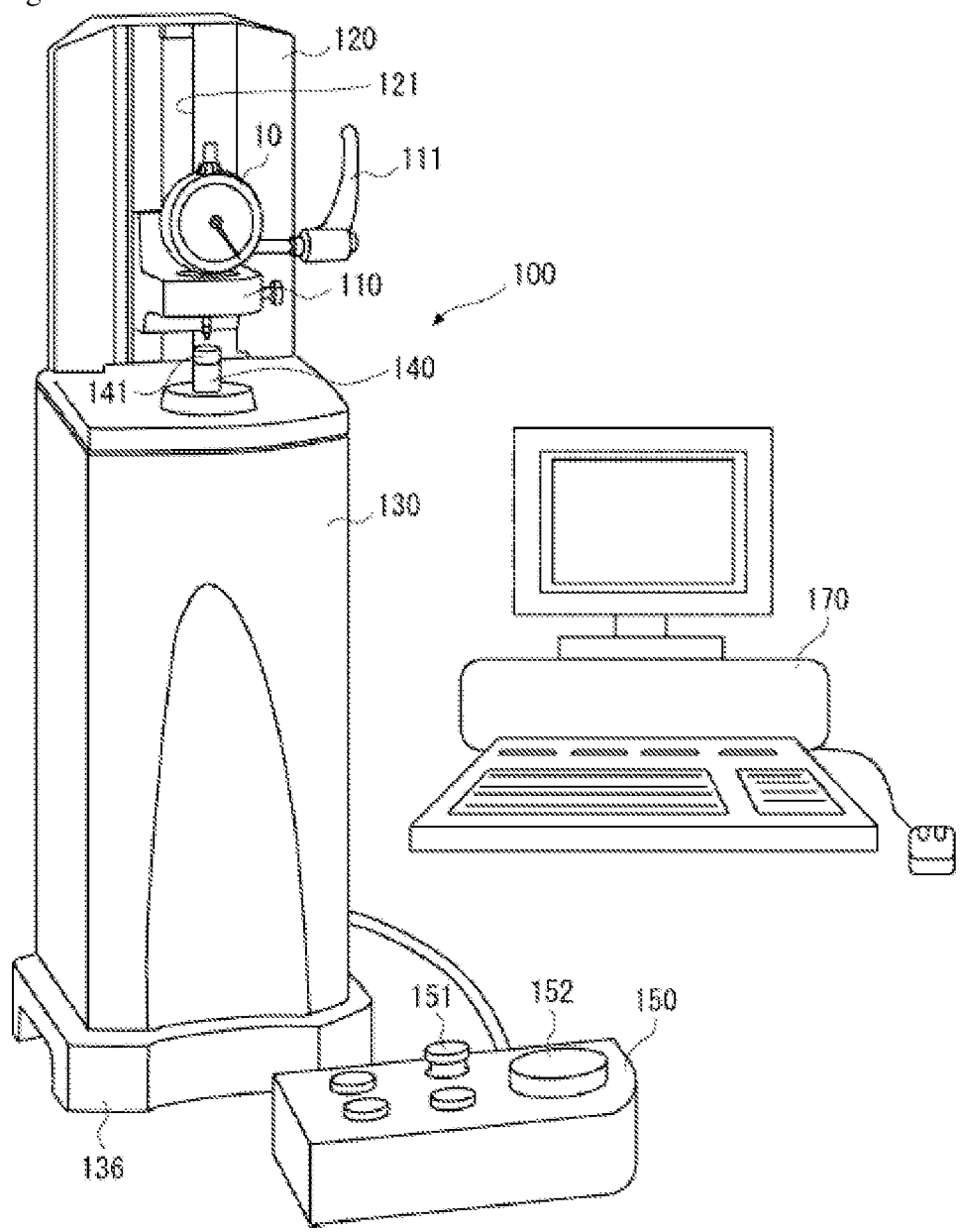
FIG. 2 illustrates a state where an indicator is arranged on the indicator inspection machine according to the first embodiment.

A description is given of an indicator inspection machine according to a first embodiment. FIG. 1 illustrates an external view of an indicator inspection machine 100 according to the first embodiment, and FIG. 2 illustrates a state where an indicator 10 is arranged on the indicator inspection machine 100 according to the first embodiment.

An indicator inspection machine 100 includes a bracket 110 which securely holds the indicator 10. The bracket 110 is configured to be capable of securely holding the indicator 10 by pinching a stem 20 of the indicator 10. The indicator 10 may come in a variety of sizes, and therefore the bracket 110 is provided so as to be freely raised and lowered so as to change a height position.

In this example, a backboard 120 stands upright on a casing 130. The backboard 120 is provided with a guide rail 121 that guides the bracket 110. This allows the bracket 110 to be held such that the bracket 110 can be raised and lowered (in other words, displaced in a vertical direction) along the guide rail 121. In addition, a position of the bracket 110 can be secured by operating a handle 111.

Figure 3:
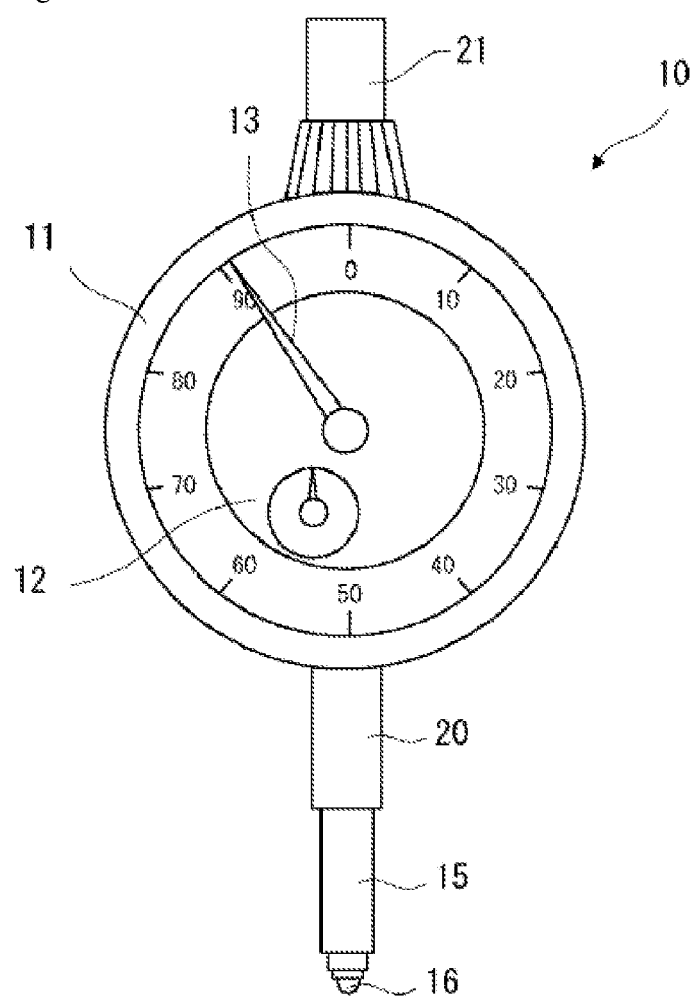
FIG. 3 illustrates an exemplary configuration of the indicator.

Here, an exemplary configuration of the indicator 10 is described. FIG. 3 illustrates an exemplary configuration of the indicator 10. The indicator 10 includes a cylindrical casing 11, a spindle 15 provided so as to be capable of being raised and lowered, and the stem 20 which projects from the casing 11. A dial face (display) 12 is provided on a front surface of the casing 11. A gear mechanism (not shown in the drawings) is provided on an interior of the casing 11, the gear mechanism magnifying a change in position of the spindle 15 and transmitting the change to a pointer 13. An indicator contact point 16 is provided to a bottom end of the spindle 15. The stem 20 slidably supports the spindle 15. The spindle 15 passes through the casing 11, and a top end of the spindle 15 projects from the casing 11. Then, in order to protect the top end portion of the spindle 15, a cap 21 is provided on a lateral surface of the casing 11.

Figure 4:
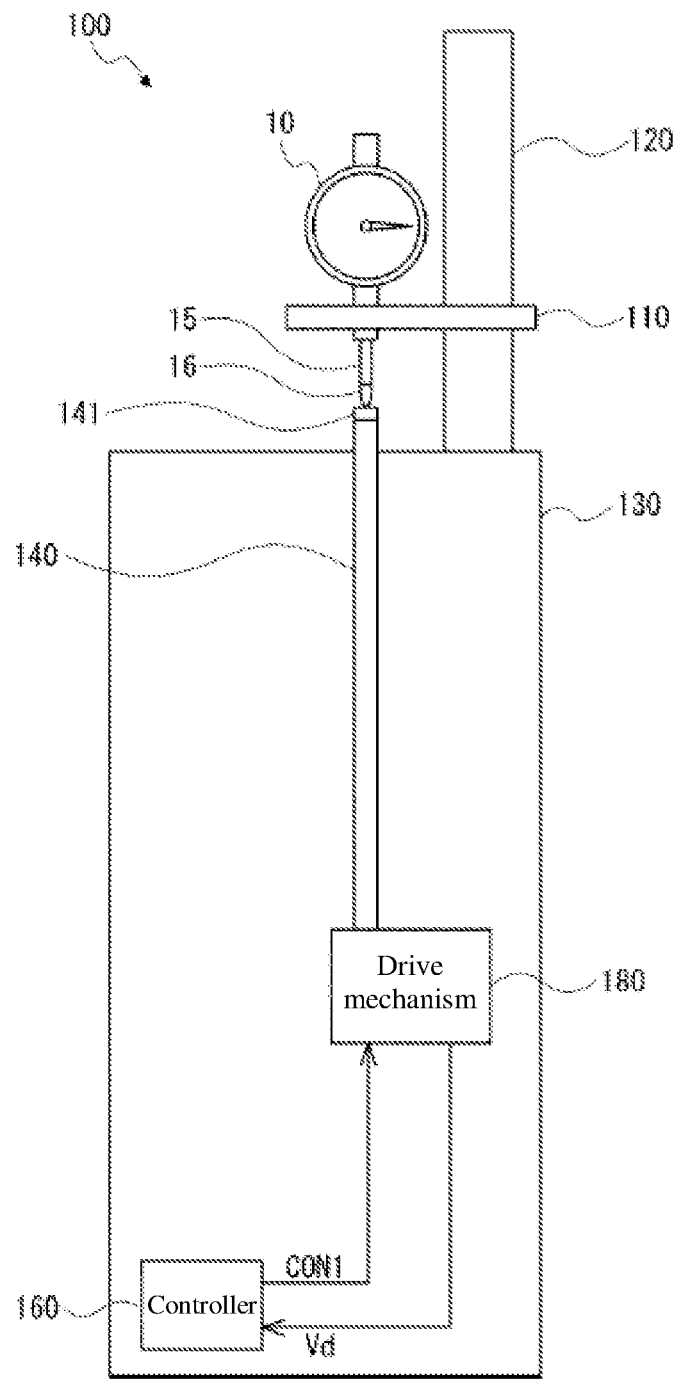
FIG. 4 illustrates a basic structure of an interior of the indicator inspection machine according to the first embodiment.
Figure 5:
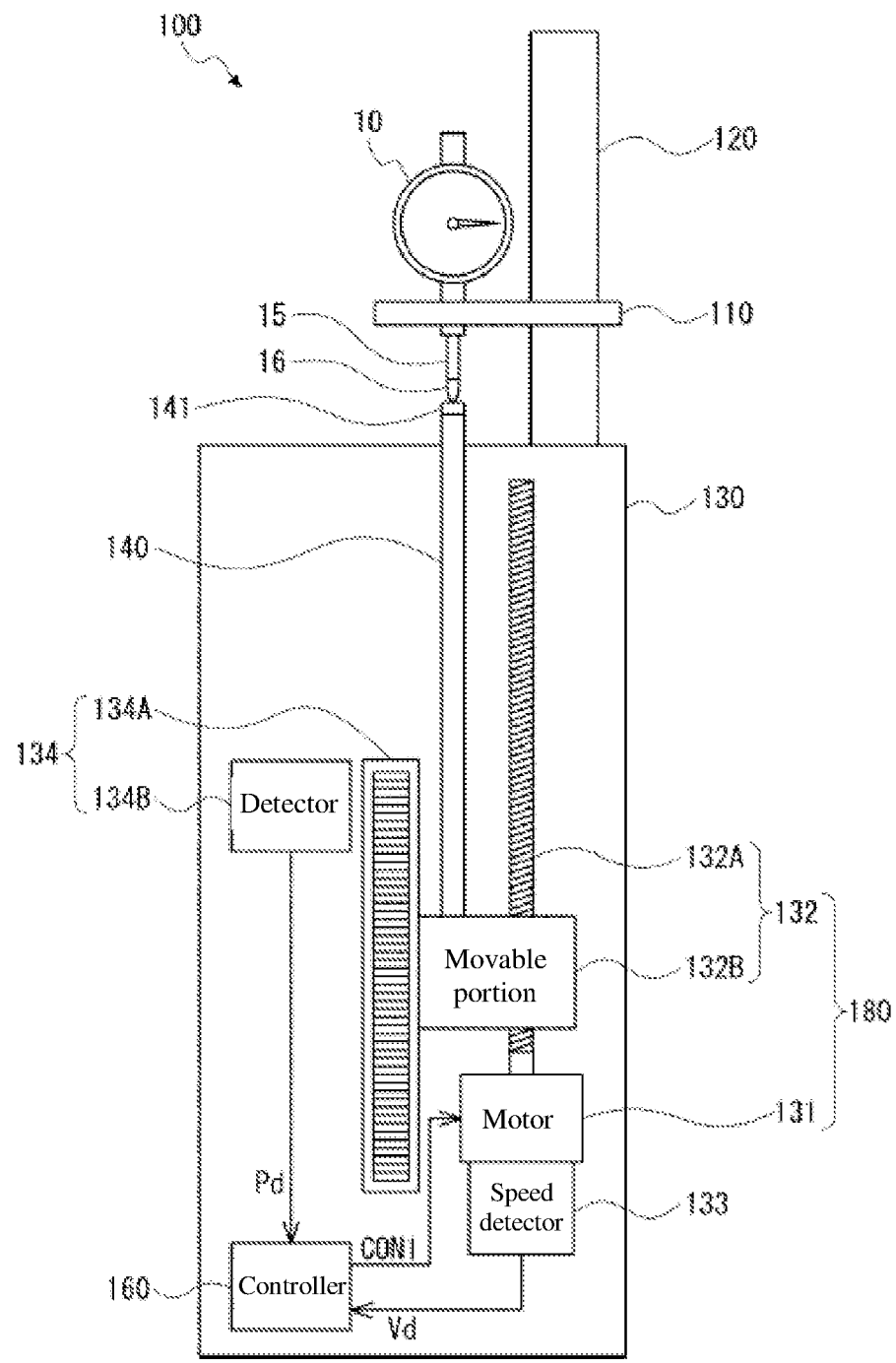
FIG. 5 schematically illustrates the structure of the interior of the indicator inspection machine according to the first embodiment.

FIG. 4 illustrates a basic structure of the interior of the indicator inspection machine 100 according to the first embodiment. FIG. 5 schematically illustrates the structure of the interior of the indicator inspection machine 100 according to the first embodiment. The indicator inspection machine 100 includes a measurement spindle 140 provided so as to be capable of advancing and retreating in the vertical direction on an interior of the casing 130, which is placed on a stand 136. As illustrated in FIG. 4, a drive mechanism (also referred to as a motor drive assembly) 180 is provided on the interior of the casing 130, and the drive mechanism 180 is configured to be capable of displacing the measurement spindle 140 in the vertical direction.

As illustrated in FIG. 5, the drive mechanism 180 includes a motor 131 and a ball screw 132. A feed thread 132A of the ball screw 132 rotates due to power from the motor 131, thereby displacing the measurement spindle 140 in the vertical direction. The measurement spindle 140 is coupled to a movable portion (movable frame) 132B, which includes a rotation-arrested nut. A linear drive mechanism other than the ball screw may be used as the drive mechanism, such as a friction driving system configured by a shaft and a twist roller.

A vertical-direction position and change in position of the measurement spindle 140 is configured to be detectable by a linear encoder 134. In this example, a scale 134A is attached to the movable portion 132B and a detector 134B detects the displacement of the scale 134A. This enables the vertical-direction position and change in position of the measurement spindle 140 to be detected.

A contact point 141 is provided to a top end of the measurement spindle 140, the contact point 141 making contact with the indicator contact point 16 of the indicator 10. A flat contact point in which the surface making contact with the indicator contact point 16 is flat can be used as the contact point 141.

Next, an indicator inspection protocol of the indicator inspection machine 100 according to the present embodiment is described.

Basic Measurement

Figure 6:
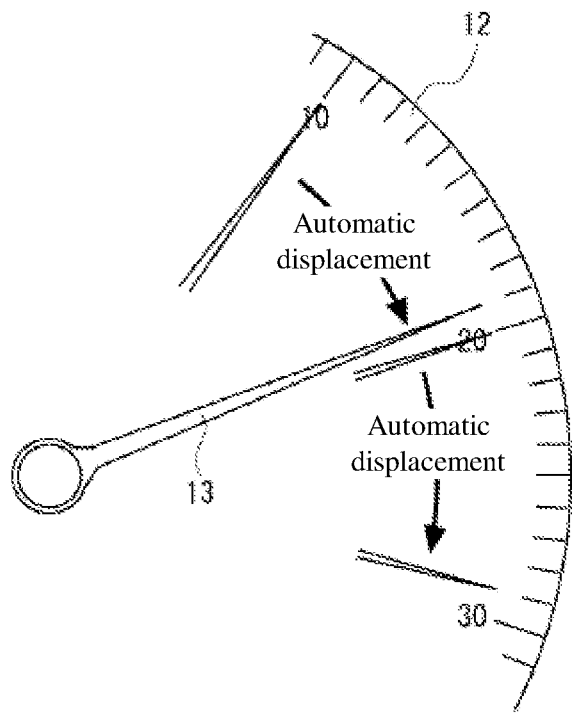
FIG. 6 illustrates movement of a pointer during inspection of the indicator.

The present description considers a case of inspecting how much an indicated value of the indicator 10 deviates from the true value. FIG. 6 illustrates movement of a pointer during inspection of the indicator. In this example, a target value for the change in position of the indicator 10 is a position at the 20 mark, and a scale interval is 0.01 mm. The indicator inspection machine 100 automatically raises the measurement spindle 140 by a value slightly smaller than the 20 mark (0.20 mm). Then, a user conducting the inspection raises the measurement spindle 140 via a manual operation and adjusts the position of the measurement spindle 140 such that the pointer 13 of the indicator 10 points to the 20. Adjustment of the position of the measurement spindle 140 via the manual operation can be performed with a switch 151 or jog dial 152 on a console 150, for example. In addition, the position of the measurement spindle 140 after the position has been adjusted by the manual operation is measured by the linear encoder 134, and the measured value is taken in and recorded by a computer 170. Similar operations are performed to change the scale value to the 30 mark (0.30 mm), the 40 mark (0.40 mm), and so on and indication accuracy across the entire measurement range of the indicator 10 is measured.

Measuring Repeatability

In order to find the repeatability of a measured value in the indicator 10, the basic measurement with the indicator 10 described above is repeated a predetermined number of times for each set value. In the indicator inspection machine 100, the measurement spindle 140 (i.e., the contact point 141) is merely raised and lowered, with no rotation. Therefore, when the contact point 141 and the indicator contact point 16 of the indicator 10 simply make contact with each other, a status of the contact between the contact point 141 and the indicator contact point 16 of the indicator 10 may be mostly constant in each of the basic measurements for measuring repeatability. However, when an actual measurement is made with the indicator 10, the status of the contact between a measured object and the indicator contact point 16 of the indicator 10 is different for each measurement. Therefore, when the contact status is mostly constant in each of the basic measurements for measuring repeatability, this means that the measurement conditions for measuring repeatability are unable to replicate actual measurement conditions.

In view of the above, in the indicator inspection machine 100, variation is introduced to the status of contact between the indicator contact point 16 and the contact point 141 by bringing the measurement spindle 140 (that is, the contact point 141) into contact with the indicator contact point 16 of the indicator 10 while oscillating the contact point 141 (in other words, while varying a displacement speed of the measurement spindle 140 and the contact point 141 at a predetermined periodicity). In the present embodiment, the contact point 141 is oscillated by controlling operation of the motor 131. This is described in detail below.

A controller 160 is configured to be capable of controlling operation of the motor 131 with a control signal CON1. Specifically, the controller 160 references a position Pd of the measurement spindle 140 as detected by the detector 134B and a rotation speed Vd of the motor as detected by a speed detector 133, and provides feedback control of the operation of the motor 131.

Figure 7:
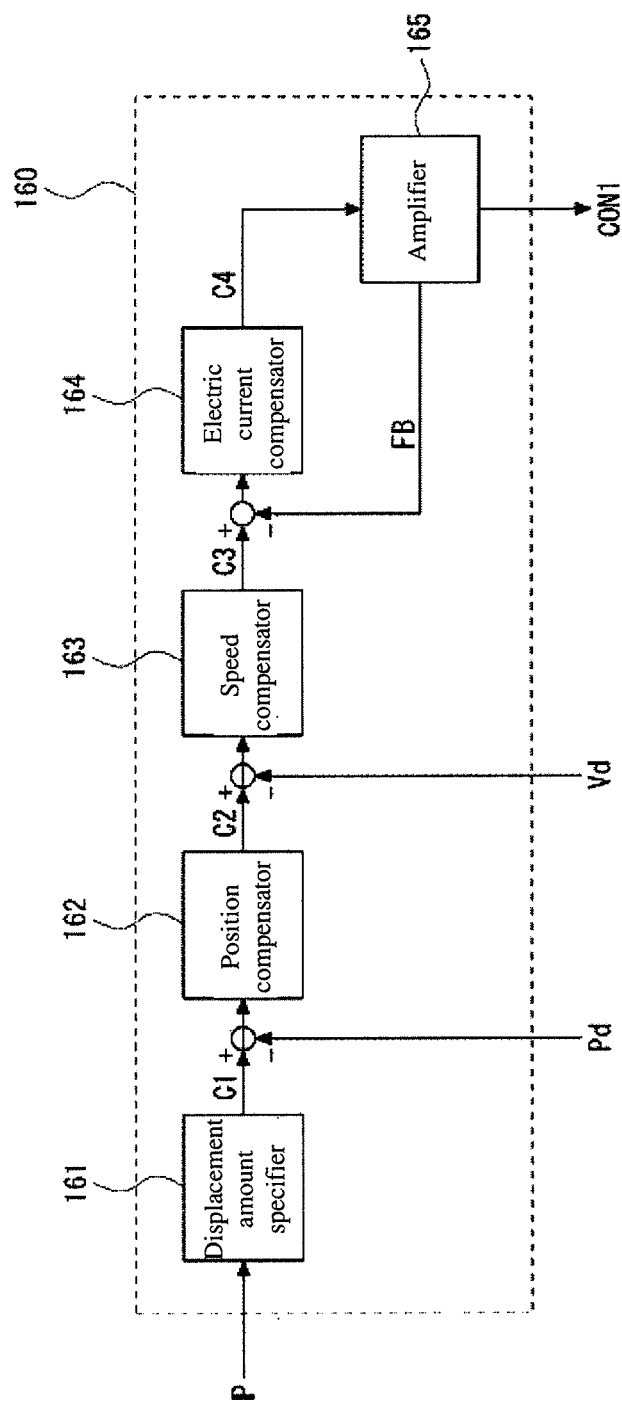
FIG. 7 schematically illustrates a configuration of a controller according to the first embodiment.

FIG. 7 schematically illustrates a configuration of the controller 160 according to the first embodiment. The controller 160 includes circuitry in the form of a displacement amount specifier 161, a position compensator 162, a speed compensator 163, an electric current compensator 164, and an amplifier 165.

Position information P specifying the position of the measurement spindle 140 is input to the displacement amount specifier 161 from an external device such as the computer 170, for example. Based on the input position information P, the displacement amount specifier 161 outputs a position command C1 specifying the position of the measurement spindle 140.

Based on the input position command C1 and the position Pd of the measurement spindle 140 which is fed back from the detector 134B, the position compensator 162 outputs a speed command C2 specifying the rotation speed of the motor. In this example, the position compensator 162 outputs the speed command C2 based on a value obtained by subtracting the position Pd of the measurement spindle 140, which is fed back from the detector 134B, from the input position command C1.

Based on the speed command C2 and the rotation speed Vd of the motor 131 which is fed back from the speed detector 133, the speed compensator 163 outputs an electric current command C3 specifying an electric current to supply to the motor 131 in order to achieve the rotation speed of the motor 131. In this example, the speed compensator 163 outputs the electric current command C3 based on a value obtained by subtracting the fed-back rotation speed Vd of the motor 131 from the speed command C2.

The electric current compensator 164 controls the electric current supplied to the motor 131 based on the electric current command C3 and an electric current feedback value FB from the amplifier 165. An output C4 of the electric current compensator 164 is input to the amplifier 165. The output of the amplifier 165 is connected to the motor 131, and the electric current feedback value FB (the output value) is fed back to the electric current compensator 164. In this example, a value obtained by subtracting the electric current feedback value FB of the amplifier 165 from the electric current command C3 is input to the electric current compensator 164. Accordingly, a control signal output to the motor from the amplifier 165 is subjected to feedback control.

In the position feedback control achieved with the above-noted configuration, by increasing gain of the position compensator 162, the contact point 141 can be rapidly displaced to a target position with a high degree of accuracy. Meanwhile, the various portions of the indicator inspection machine each have a natural frequency that depends on the mass, rigidity, and dimensions of each portion. Therefore, depending on the gain of the position compensator 162, oscillation at the natural frequency may occur. In such a case, the natural frequency is at least roughly 10 Hz, and is typically around tens to hundreds of Hz.

In the present embodiment, by making use of this phenomenon and setting the gain of the position compensator 162 to a desired value, vibration at a constant natural frequency is deliberately generated and the contact point 141 is oscillated. Accordingly, the contact point 141 oscillates at the natural frequency, and therefore the status of contact for each measurement in the measurement of repeatability can be changed. At this point, as noted above, the gain of the position compensator 162 is preferably set to a value that generates an impact similar to that of a case where the indicator contact point 16 of the indicator 10 drops freely onto the contact point 141.

In the foregoing description, according to the present configuration, when measuring repeatability, the status of contact between the indicator contact point 16 and the contact point 141 can be changed by controlling the operation of the motor. Accordingly, a reduction in measurement accuracy arising from the contact status remaining constant can be prevented.

Furthermore, in the present configuration, merely setting the gain of the position compensator 162 is sufficient, without adding an oscillating mechanism or the like that causes the contact point 141 to oscillate. Therefore, because the contact point 141 can be readily oscillated without incurring any new costs, the configuration may be termed advantageous.

Moreover, there is also no need for the indicator contact point 16 to drop freely, and therefore damage to the contact point 141 such as abrasion or dents can also be prevented.

Second Embodiment

Figure 8:
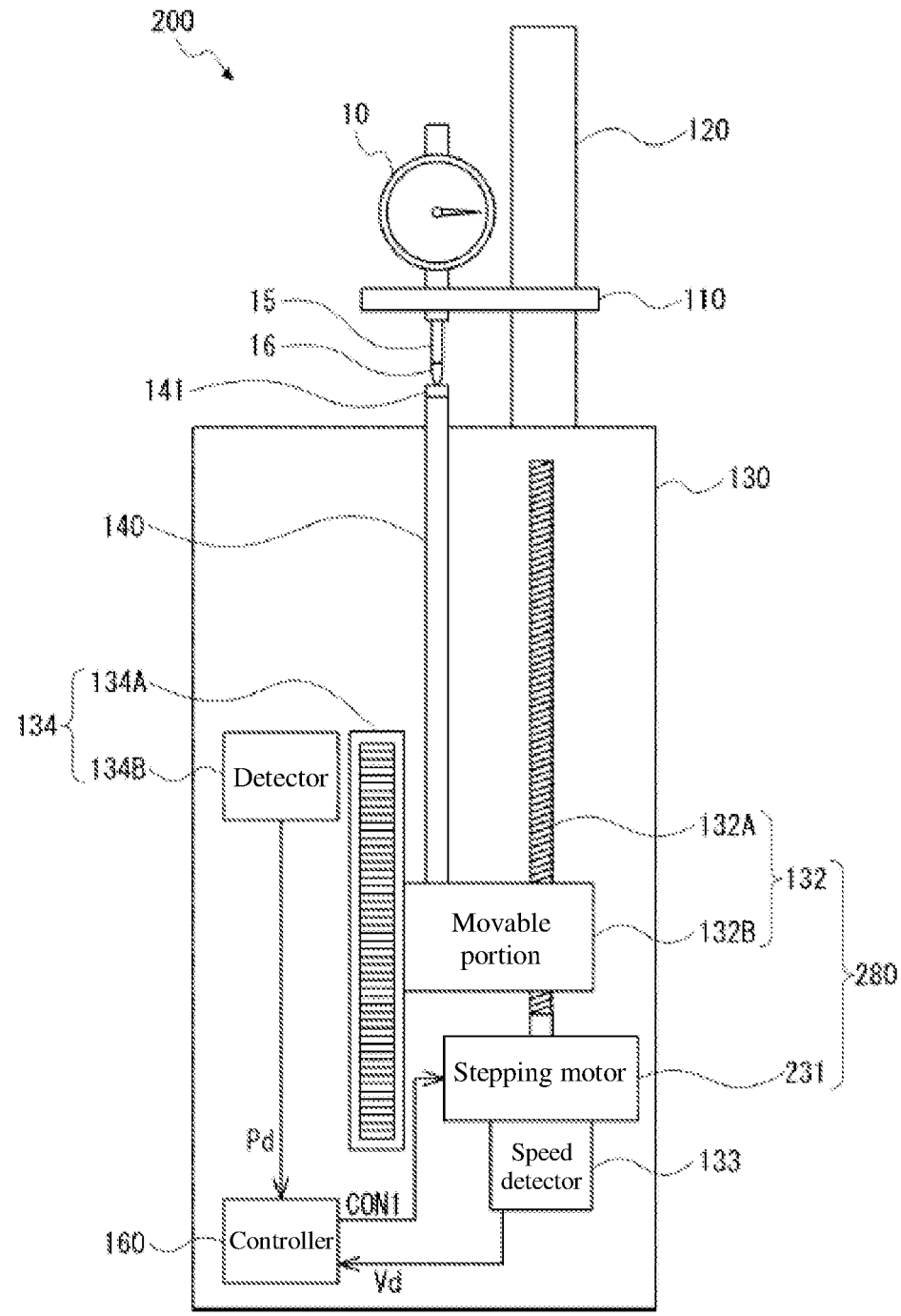
FIG. 8 schematically illustrates an interior structure of an indicator inspection machine according to a second embodiment.

A description is given of an indicator inspection machine 200 according to a second embodiment. FIG. 8 schematically illustrates an interior structure of the indicator inspection machine 200 according to the second embodiment. The indicator inspection machine 200 includes a drive mechanism (also referred to as a motor drive assembly) 280 instead of the drive mechanism 180 of the indicator inspection machine 100 according to the first embodiment. Other configurations of the indicator inspection machine 200 are similar to those of the indicator inspection machine 100 according to the first embodiment.

The drive mechanism 280 has a configuration in which the motor 131 of the drive mechanism 180 is exchanged for a stepping motor 231. The stepping motor 231 is controlled by the controller 160 and performs a step operation that moves stepwise in a rotation direction. During the step operation of the stepping motor 231, rotation and stopping are repeatedly performed. Therefore, the rotation speed at each step can be understood to be higher than the average rotation speed of the overall rotational movement of the stepping motor 231. Therefore, when the measurement spindle 140 is raised by the stepping motor 231, the contact point 141 strikes the indicator contact point 16 at the rotation speed for each step. Accordingly, compared to a case using the motor 131, which does not involve stepping operations, the status of contact between the indicator contact point 16 and the contact point 141 can be changed. Accordingly, a reduction in measurement accuracy arising from the contact status remaining constant can be prevented.

As noted above, the rotation speed at each step of the step operation of the stepping motor 231 is preferably set to a speed that generates an impact similar to that of a case where the indicator contact point 16 of the indicator 10 drops freely onto the contact point 141.

Here, an example using a stepping motor was described. However, a pseudo-stepping operation may also be performed in the motor 131 in the indicator inspection machine 100 according to the first embodiment by having the controller 160 control the electric current supplied to the motor 131.

The stepping motor used in the present configuration can be driven by open loop control, and therefore a control schema and control mechanism can also be simplified as compared to the closed loop control of the indicator inspection machine 100 according to the first embodiment.

Third Embodiment

Figure 9:
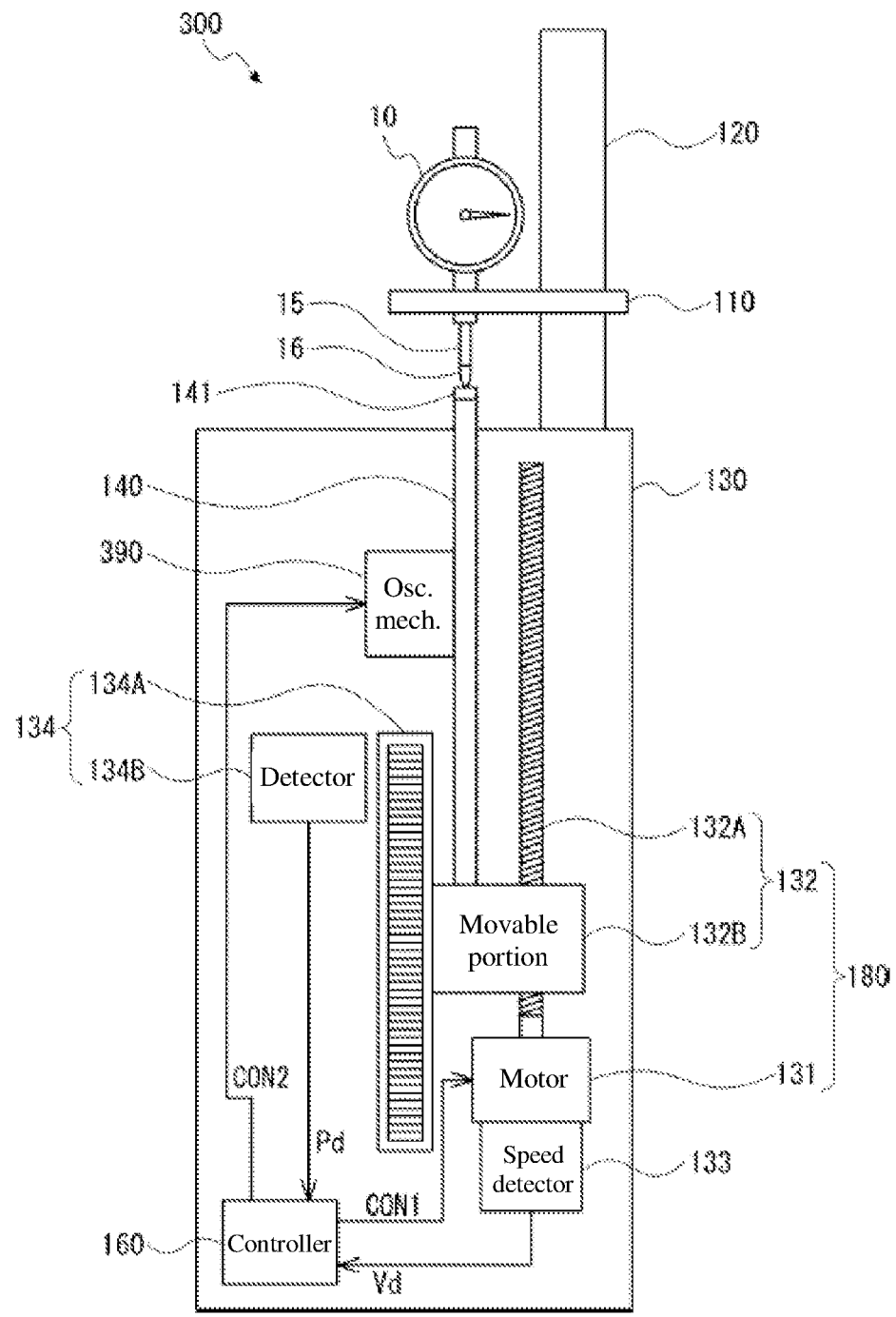
FIG. 9 schematically illustrates an interior structure of an indicator inspection machine according to a third embodiment.

A description is given of an indicator inspection machine 300 according to a third embodiment. FIG. 9 schematically illustrates an interior structure of an indicator inspection machine 300 according to the third embodiment. The indicator inspection machine 300 has a configuration in which an oscillating mechanism 390 is added to the indicator inspection machine 100 according to the first embodiment. Other configurations of the indicator inspection machine 300 are similar to those of the indicator inspection machine 100 according to the first embodiment.

For example, the oscillating mechanism 390 includes an oscillation generator such as a crystal resonator that induces oscillation, and is configured to be capable of transmitting the generated oscillation to the measurement spindle 140. In this example, the oscillating mechanism 390 is attached to the measurement spindle 140. The controller 160 can control the oscillating mechanism 390 with a control signal CON2.

When the measurement spindle 140 is raised and lowered in a state where the oscillating mechanism 390 is oscillating, the contact point 141 is raised and lowered while oscillating due to the oscillating mechanism 390. Accordingly, when the contact point 141 contacts the indicator contact point 16, the status of the contact between the indicator contact point 16 and the contact point 141 can be changed for each measurement due to the oscillation of the contact point 141 (that is, changes in speed for a predetermined frequency). Accordingly, the status of the contact between the indicator contact point 16 and the contact point 141 during actual measurement of the measured object can be artificially recreated, similar to an inspection method using a release as recommended by the Japanese Industrial Standards, and therefore inspection can yield an evaluation of measurement accuracy for the indicator 10 that is more highly reliable.

As noted above, the oscillation frequency of the oscillating mechanism 390 is preferably set to a speed that generates an impact similar to that of a case where the indicator contact point 16 drops freely onto the contact point 141. In addition, from a perspective of efficiently oscillating the contact point 141, an oscillation direction of the oscillating mechanism 390 may be a center axis direction of the measurement spindle 140 and the frequency may be matched to the natural frequency of the indicator inspection machine 100.

Other Embodiments

Moreover, the present invention is not limited to the embodiments described above, and may be modified as needed without departing from the scope of the present invention. For example, the controller 160 raises and lowers the measurement spindle 140 while oscillating the measurement spindle 140 at a predetermined periodicity, and conducts a plurality of measurements in order to inspect repeatability. At such times, during each of the plurality of measurements, the measurement spindle 140 may be raised and lowered such that the indicator contact point 16 and the contact point 141 maintain contact. In such a case, although contact is maintained, due to the measurement spindle 140 oscillating, the status of the contact between the indicator contact point 16 and the contact point 141 changes for each measurement, and thus the status of contact during actual measurement of the measured object can be artificially recreated. Therefore, reliability of inspection accuracy can be improved. In addition, during each of the plurality of measurements, the measurement spindle 140 may be raised and lowered such that the indicator contact point 16 and the contact point 141 are physically separated. In such a case, the indicator contact point 16 and the contact point 141 make fresh contact for each measurement, and therefore the contact status can be reliably changed, and reliability of inspection accuracy can be further improved.

In the foregoing description, a measurement spindle is raised and lowered by a controller controlling operation of a drive mechanism. The controller can also be configured by a hardware resource such as a computer, and can control the operation of the drive mechanism to raise and lower the measurement spindle by executing a program. The program can be stored using various types of non-transitory computer-readable media and can be supplied to the computer. Non-transitory computer-readable media include various types of tangible storage media. Examples of non-transitory computer-readable media include a magnetic storage medium (for example, a flexible disk, magnetic tape, and a hard disk drive); a magneto-optical storage medium (for example, a magneto-optical disk); a CD-ROM (Read Only Memory); a CD-R; a CD-R/W; and a semiconductor memory (for example, a mask ROM, PROM (Programmable ROM), EPROM (Erasable PROM), flash ROM, and RAM (Random Access Memory)). In addition, the program may be supplied to the computer by various types of transitory computer readable media. Examples of transitory computer readable media include an electric signal, an optical signal, and an electromagnetic wave. Transitory computer readable media can supply the program to the computer via a wired communication channel such as electric wires and optical fibers, or via a wireless communication channel.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. An indicator inspection machine that inspects the accuracy of an indicator based on a value displayed by the indicator when a spindle of the indicator to be inspected changes position, the indicator inspection machine comprising:
    a measurement spindle configured to be freely raised and lowered so as to displace the spindle of the indicator;
    a contact point provided on a distalmost end of the measurement spindle, the contact point configured to make contact with an indicator contact point provided on a distalmost end of the spindle of the indicator;
    a motor drive assembly that drives the measurement spindle; and
    a controller that controls the motor drive assembly so as to bring the contact point into contact with the indicator contact point while changing a speed of the measurement spindle at a predetermined periodicity.

2. The indicator inspection machine according to claim 1, wherein the controller further controls the motor drive assembly such that the measurement spindle is raised and lowered while oscillating at the natural frequency of the indicator inspection machine.

3. The indicator inspection machine according to claim 2, further comprising:
    a position detector that detects a position of the measurement spindle, wherein, based on the speed of the measurement spindle and the detected position of the measurement spindle, the controller provides feedback control of operation of the measurement spindle.

4. The indicator inspection machine according to claim 3, wherein the motor drive assembly comprises:
    a motor;
    a movable frame configured to be raised and lowered when driven by the motor; and
    a speed detector that detects a rotation speed of the motor, wherein:
    the measurement spindle is coupled to the movable frame, and
    the controller provides feedback control of operation of the measurement spindle based on the rotation speed of the motor detected by the speed detector and the detected position of the measurement spindle.

5. The indicator inspection machine according to claim 4, wherein the controller comprises circuitry including the following configuration:
    a displacement amount specifier that outputs a displacement command specifying an amount of displacement to impart to the measurement spindle in accordance with a command specifying a desired position for the measurement spindle;
    a position compensator that outputs a speed command specifying the speed of the measurement spindle based on the displacement command and the position of the measurement spindle detected by the position detector;
    a speed compensator that outputs an electric current command specifying an electric current to supply to the motor based on the speed command and the rotation speed of the motor detected by the speed detector;
    an electric current compensator to which the electric current command is input; and
    an amplifier in which an input is connected to an output of the electric current compensator, the amplifier configured to amplify and outputting to the motor the electric current command that is compensated by the electric current compensator and also feeding a value for the electric current supplied to the motor back to the input of the electric current compensator,
    wherein gain of the position compensator is set such that the measurement spindle is raised and lowered while oscillating at the natural frequency of the indicator inspection machine.

6. The indicator inspection machine according to claim 1, wherein the motor drive assembly is configured to perform a step operation that raises and lowers the measurement spindle in a stepwise manner.

7. The indicator inspection machine according to claim 6, wherein the motor drive assembly comprises:
    a stepping motor; and
    a movable frame configured to be raised and lowered when driven by the stepping motor,
    wherein the measurement spindle is coupled to the movable frame.

8. The indicator inspection machine according to claim 6, wherein the motor drive assembly comprises:
    a motor; and
    a movable frame configured to be raised and lowered when driven by the motor, wherein the controller is configured to control the motor so as to perform a step operation.

9. The indicator inspection machine according to claim 1, further comprising an oscillator configured to transmit a generated oscillation to the measurement spindle.

10. The indicator inspection machine according to claim 1, wherein, when inspecting repeatability of an indicated value of the indicator by measuring the indicated value of the indicator a plurality of times, the controller raises and lowers the spindle such that contact between the contact point of the indicator inspection machine and the contact point of the indicator is maintained during each of the plurality of measurements.

11. The indicator inspection machine according to claim 2, wherein, when inspecting repeatability of an indicated value of the indicator by measuring the indicated value of the indicator a plurality of times, the controller raises and lowers the spindle such that contact between the contact point of the indicator inspection machine and the contact point of the indicator is maintained during each of the plurality of measurements.

12. The indicator inspection machine according to claim 3, wherein, when inspecting repeatability of an indicated value of the indicator by measuring the indicated value of the indicator a plurality of times, the controller raises and lowers the spindle such that contact between the contact point of the indicator inspection machine and the contact point of the indicator is maintained during each of the plurality of measurements.

13. The indicator inspection machine according to claim 4, wherein, when inspecting repeatability of an indicated value of the indicator by measuring the indicated value of the indicator a plurality of times, the controller raises and lowers the spindle such that contact between the contact point of the indicator inspection machine and the contact point of the indicator is maintained during each of the plurality of measurements.

14. The indicator inspection machine according to claim 5, wherein, when inspecting repeatability of an indicated value of the indicator by measuring the indicated value of the indicator a plurality of times, the controller raises and lowers the spindle such that contact between the contact point of the indicator inspection machine and the contact point of the indicator is maintained during each of the plurality of measurements.

15. The indicator inspection machine according to claim 6, wherein, when inspecting repeatability of an indicated value of the indicator by measuring the indicated value of the indicator a plurality of times, the controller raises and lowers the spindle such that contact between the contact point of the indicator inspection machine and the contact point of the indicator is maintained during each of the plurality of measurements.

16. The indicator inspection machine according to claim 7, wherein, when inspecting repeatability of an indicated value of the indicator by measuring the indicated value of the indicator a plurality of times, the controller raises and lowers the spindle such that contact between the contact point of the indicator inspection machine and the contact point of the indicator is maintained during each of the plurality of measurements.

17. The indicator inspection machine according to claim 8, wherein, when inspecting repeatability of an indicated value of the indicator by measuring the indicated value of the indicator a plurality of times, the controller raises and lowers the spindle such that contact between the contact point of the indicator inspection machine and the contact point of the indicator is maintained during each of the plurality of measurements.

18. The indicator inspection machine according to claim 9, wherein, when inspecting repeatability of an indicated value of the indicator by measuring the indicated value of the indicator a plurality of times, the controller raises and lowers the spindle such that contact between the contact point of the indicator inspection machine and the contact point of the indicator is maintained during each of the plurality of measurements.

19. The indicator inspection machine according to claim 1, wherein, when inspecting repeatability of the indicated value of the indicator by measuring the indicated value of the indicator a plurality of times, the controller raises and lowers the spindle such that the contact point of the indicator inspection machine and the contact point of the indicator are separated during each of the plurality of measurements.

20. The indicator inspection machine according to claim 2, wherein, when inspecting repeatability of the indicated value of the indicator by measuring the indicated value of the indicator a plurality of times, the controller raises and lowers the spindle such that the contact point of the indicator inspection machine and the contact point of the indicator are separated during each of the plurality of measurements.

21. The indicator inspection machine according to claim 3, wherein, when inspecting repeatability of the indicated value of the indicator by measuring the indicated value of the indicator a plurality of times, the controller raises and lowers the spindle such that the contact point of the indicator inspection machine and the contact point of the indicator are separated during each of the plurality of measurements.

22. The indicator inspection machine according to claim 4, wherein, when inspecting repeatability of the indicated value of the indicator by measuring the indicated value of the indicator a plurality of times, the controller raises and lowers the spindle such that the contact point of the indicator inspection machine and the contact point of the indicator are separated during each of the plurality of measurements.

23. The indicator inspection machine according to claim 5, wherein, when inspecting repeatability of the indicated value of the indicator by measuring the indicated value of the indicator a plurality of times, the controller raises and lowers the spindle such that the contact point of the indicator inspection machine and the contact point of the indicator are separated during each of the plurality of measurements.

24. The indicator inspection machine according to claim 6, wherein, when inspecting repeatability of the indicated value of the indicator by measuring the indicated value of the indicator a plurality of times, the controller raises and lowers the spindle such that the contact point of the indicator inspection machine and the contact point of the indicator are separated during each of the plurality of measurements.

25. The indicator inspection machine according to claim 7, wherein, when inspecting repeatability of the indicated value of the indicator by measuring the indicated value of the indicator a plurality of times, the controller raises and lowers the spindle such that the contact point of the indicator inspection machine and the contact point of the indicator are separated during each of the plurality of measurements.

26. The indicator inspection machine according to claim 8, wherein, when inspecting repeatability of the indicated value of the indicator by measuring the indicated value of the indicator a plurality of times, the controller raises and lowers the spindle such that the contact point of the indicator inspection machine and the contact point of the indicator are separated during each of the plurality of measurements.

27. The indicator inspection machine according to claim 9, wherein, when inspecting repeatability of the indicated value of the indicator by measuring the indicated value of the indicator a plurality of times, the controller raises and lowers the spindle such that the contact point of the indicator inspection machine and the contact point of the indicator are separated during each of the plurality of measurements.

28. An indicator inspection method wherein accuracy of the indicator is inspected based on a value displayed by the indicator when a spindle of the indicator is displaced in an indicator inspection machine having a measurement spindle provided so as to be freely raised and lowered in order to displace the spindle of the indicator to be inspected, a contact point provided to a distalmost end of the measurement spindle, and the contact point making contact with an indicator contact point provided to a distalmost end of the spindle of the indicator, the method comprising:

driving, via a motor drive assembly, the measurement spindle; and controlling the motor drive assembly so as to bring the contact point into contact with the indicator contact point while changing a speed of the measurement spindle at a predetermined periodicity.

29. At least one tangible, non-transitory computer-readable medium storing an executable set of instructions for operating an indicator inspection program, wherein accuracy of an indicator is inspected based on a value displayed by the indicator when a spindle of the indicator is displaced in an indicator inspection machine having a measurement spindle provided so as to be freely raised and lowered in order to displace the spindle of the indicator to be inspected, a contact point provided to a distalmost end of the measurement spindle, the contact point making contact with an indicator contact point provided to a distalmost end of the spindle of the indicator, a motor drive assembly driving the measurement spindle, and a controller controlling the motor drive assembly so as to bring the contact point into contact with the indicator contact point while changing a speed of the measurement spindle at a predetermined periodicity, wherein the set of instructions, when executed by a computer processor, causes the computer processor to execute operations comprising:

controlling the motor drive assembly so as to bring the contact point into contact with the indicator contact point while changing the speed of the measurement spindle at a predetermined periodicity.

\* \* \* \* \*